(12) United States Patent  (10) Patent No.: US 10,095,231 B2
Gordon et al.  (45) Date of Patent: *Oct. 9, 2018

(54) DRONE AND DRONE-BASED SYSTEM FOR COLLECTING AND MANAGING WASTE FOR IMPROVED SANITATION

(71) Applicant: International Business Machines Corporation, Armonk, NY (US)

(72) Inventors: Michael S. Gordon, Yorktown Heights, NY (US); Meenal Pore, Nairobi (KE); Komminist Weldemariam, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 30 days.

This patent is subject to a terminal disclaimer.

(21) Appl. No.: 15/264,720

(22) Filed: Sep. 14, 2016

(65) Prior Publication Data

US 2018/0074496 A1  Mar. 15, 2018

(51) Int. Cl.
| | |
|---|---|
| *B64C 39/02* | (2006.01) |
| *G06Q 10/00* | (2012.01) |
| *G05D 1/00* | (2006.01) |
| *B64D 47/08* | (2006.01) |
| *B64D 1/22* | (2006.01) |
| *G06K 9/00* | (2006.01) |
| *G06K 9/62* | (2006.01) |

(52) U.S. Cl.
CPC ......... *G05D 1/0088* (2013.01); *B64C 39/024* (2013.01); *B64D 1/22* (2013.01); *B64D 47/08* (2013.01); *G06K 9/0063* (2013.01); *G06K 9/6202* (2013.01); *G06Q 10/30* (2013.01); *B64C 2201/12* (2013.01)

(58) Field of Classification Search
CPC ......... G05D 1/0088; G05D 2201/0207; G06Q 10/30; B64C 2201/0207; B64C 39/024
USPC .......................................................... 701/3
See application file for complete search history.

(56) References Cited

U.S. PATENT DOCUMENTS

| | | |
|---|---|---|
| 5,699,525 A | 12/1997 | Embutsu |
| 6,117,671 A | 9/2000 | Yilmaz |
| 8,560,459 B2 | 10/2013 | Bohlig et al. |

(Continued)

FOREIGN PATENT DOCUMENTS

| | | | |
|---|---|---|---|
| KR | 20150141918 A | * | 12/2015 |
| WO | 2009061264 A1 | | 5/2009 |
| WO | 2015150529 A1 | | 10/2015 |

OTHER PUBLICATIONS

English Translation: Ahn, KR 20150141918 A, Dec. 2015, Korean Patent Office Publication (Year: 2015).*

(Continued)

*Primary Examiner* — Nadeem N Odeh
(74) *Attorney, Agent, or Firm* — Harrington & Smith; Louis J. Percello

(57) ABSTRACT

A type of a waste item is identified at a waste collection location using at least a drone-based system. The drone-based system characterizes one or more properties of the waste item. Based on the identified type and the one or more properties, the drone-based system performs a risk assessment based on human health of content of the waste item. One or more actions are taken by one or more drones of the drone-based system based on the risk assessment of the content of the waste item.

18 Claims, 4 Drawing Sheets

(56) References Cited

U.S. PATENT DOCUMENTS

| | | | |
|---|---|---|---|
| 2007/0268759 A1 | 11/2007 | Sabino et al. | |
| 2015/0088310 A1* | 3/2015 | Pinter | G06Q 50/22 700/253 |
| 2015/0324760 A1* | 11/2015 | Borowski | B65F 1/0006 705/308 |
| 2016/0259341 A1* | 9/2016 | High | B66F 9/063 |
| 2016/0379152 A1* | 12/2016 | Rodoni | G06Q 10/06398 705/7.15 |

OTHER PUBLICATIONS

Talesofinterest.net, Garbage Collecting Drone Destroys Ocean Pollution, Aug. 28, 2012, Talesofinterest.net Website <http://www.talesofinterest.net/garbage-collecting-drone-destroys-ocean-pollution/> (Year: 2012).*

"Drones to nab UAE litterbugs", UAE interact (2016), downloaded on Jul. 20, 2016 from http://www.uaeinteract.com/docs/Drones_to_nab_Dubai_litterbugs/74872.htm.

"Flying Toilet", Wikipedia article, last modified on Jul. 1, 2016 at 01:47, downloaded on Jul. 20, 2016 from https://en.wikipedia.org/wiki/Flying_toilet.

"Watch this drone-guided robot empty the trash: Students unveil prototype system for automated garbage collection", The Verge (Feb. 25, 2016), downloaded on Jul. 20, 2016 from http://www.theverge.com/2016/2/25/11112160/volvo-robot-drone-trash-prototype.

"International Research Project Uses Drones for Garbage Pickup", DroneLife.com (Feb. 29, 2016), downloaded on Jul. 20, 2016 from http://dronelife.com/2016/02/29/international-research-project-uses-drones-for-garbage-pickup/.

"Zipline—The Future of Healthcare is out for Delivery" (no date on website), downloaded on Jul. 22, 2016 from http://flyzipline.com/product/.

DHL, "DHL parcelcopter launches initial operations for research purposes" (Sep. 24, 2014), downloaded an Jul. 22, 2016 from http://www.dhl.com/en/press/releases/releases_2014/group/dhl_parcelcopter_launches_initial_operations_for_research_purposes.html.

"Red Bird. Better Data. Better Decisions" (2016), downloaded on Jul. 22, 2016 from http://www.getredbird.com/en/technology.

"DJI Introduces Company's First Agriculture Drone" (Nov. 27, 2015), downloaded on Jul. 22, 2016 from https://www.dji.com/newsroom/news/dji-introduces-company-s-first-agriculture-drone.

"Run your drone business on Skyward" (2016), downloaded on Jul. 22, 2016 from https://skyward.io.

* cited by examiner

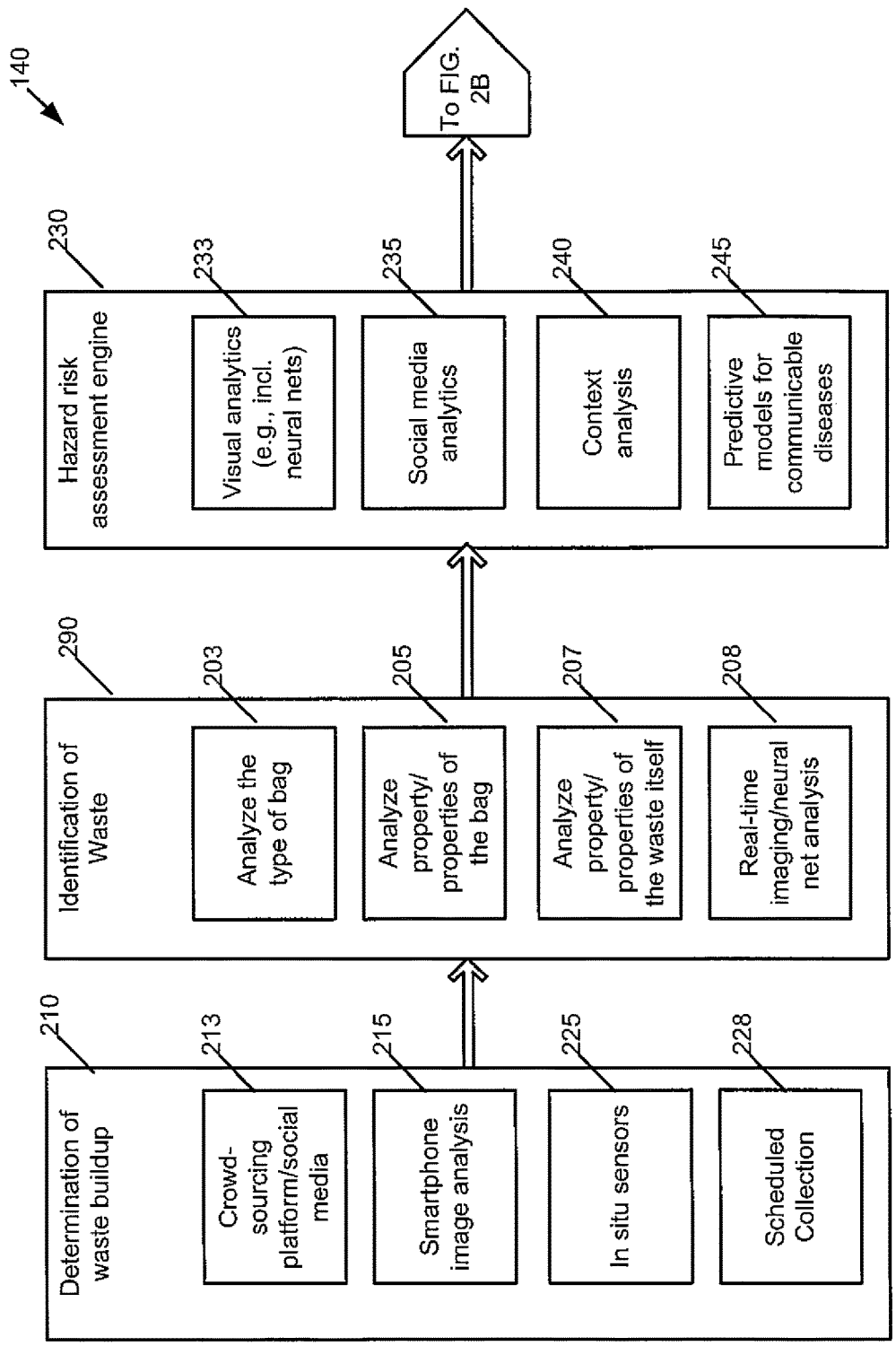

DRONE AND DRONE-BASED SYSTEM FOR COLLECTING AND MANAGING WASTE FOR IMPROVED SANITATION

BACKGROUND

The present invention relates to drones, and more particularly to using drones for collecting and managing waste.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

In developing countries, a complex infrastructure does not exist for routine waste collection or collection/separation of recyclable items. As such, it is common for waste to pile up in locations where high densities of people reside. Furthermore, the recyclables are typically not separated from the trash, which can both add to the volume of trash, and add burdens to public health.

In several developing countries (such as Kenya) and in Indian cities, generally waste collection happens after several complaints have been filled by residents or after an incident has occurred. Once reported, collection of the waste is often slow, sometimes due to socio-economic issues, due to behavior issues, or due to infrastructural challenges. Several millions of dollars have been spent by donors and NGOs (non-governmental organizations) in partnership with local governments to fix the problem. However, the situation remains unresolved, in part due to the rapid population growth in certain locations of these countries.

As a result, waste collection services may be limited to individual collectors manually picking up waste from households and businesses, which is at times not possible due to poor road infrastructure and weather conditions, e.g., the yearly floods in Nairobi.

Furthermore, traditional waste collection systems used in developed economies, such as garbage trucks and formal sewer networks, are difficult to build for low-income and similar areas in developing cities, largely due to unplanned, rapid urbanization.

The lack of access to basic sanitation, including toilets, is an issue in many developing countries, particularly in areas of high population density. In several countries, waste is placed in black polythene bags and disposed of on rooftops, dumping sites and drainage trenches, where the piles of bags attract flies, burst open upon impact and/or clog drainage systems. Furthermore, this waste can pollute water supplies causing diseases such as diarrhea, skin disorders, typhoid fever and malaria. An example of such waste disposal is the flying toilet concept: See en.wikipedia.org/wiki/Flying_toilet.

A low-tech solution to the disposal of waste is the Peepoo bag (costing two or three cents each), a biodegradable plastic bag that serves as a single-use toilet for individuals in the developing world. After the bag is used and buried in the ground, urea crystals coating the bag sterilize the solid human waste and break it down into fertilizer for crops. See, e.g., en.wikipedia.org/wiki/Flying_toilet.

Due to densely populated nature of some areas, it is difficult for garbage collection trucks to access the collection locations causing a huge sanitation problem. In particular, during raining season it is almost impossible to access such locations.

It would be beneficial to address these issues.

SUMMARY

This section is intended to include examples and is not intended to be limiting.

In one exemplary embodiment, a method includes identifying a type of a waste item at a waste collection location using at least a drone-based system, and characterizing by the drone-based system one or more properties of the waste item. The method also includes, based on the identified type and the one or more properties, performing by the drone-based system a risk assessment based on human health of content of the waste item, and taking at least one action by one or more drones of the drone-based system based on the risk assessment of the content of the waste item.

As another example, a computer program product comprises a computer readable storage medium having program instructions embodied therewith. The program instructions are executable by a drone-based system to cause the drone-based system to perform at least the following: identifying a type of a waste item at a waste collection location using at least the drone-based system; characterizing by the drone-based system one or more properties of the waste item; and based on the identified type and the one or more properties, performing by the drone-based system a risk assessment based on human health of content of the waste item, and taking at least one action by one or more drones of the drone-based system based on the risk assessment of the content of the waste item.

As a further example, an apparatus comprises a drone-based system comprising: one or more drones; one or more memories and computer readable code; and one or more processors. The one or more processors, in response to execution of the computer readable code, cause the drone-based system to perform at least the following: identifying a type of a waste item at a waste collection location using at least a drone-based system; characterizing by the drone-based system one or more properties of the waste item; and based on the identified type and the one or more properties, performing by the drone-based system a risk assessment based on human health of content of the waste item, and taking at least one action by the one or more drones of the drone-based system based on the risk assessment of the content of the waste item.

BRIEF DESCRIPTION OF THE SEVERAL VIEWS OF THE DRAWINGS

FIG. 2, divided into FIGS. 2A and 2B, illustrates a block diagram of a possible implementation of the waste collection and management control code 140.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As described above, there are issues with waste management in many locations in the world. For instance, there is currently no solution to remotely identify and process waste in hard-to-reach, densely populated areas. There is currently no direct learning technology used to differentiate hazardous waste that could lead to an infectious disease outbreak, from that which is harmless beyond being a public nuisance. Additionally, there is currently no regularly scheduled waste collection technology that is capable of waste collection in densely populated urban areas with poor resource constraints such as poor or otherwise no sewage systems and sanitation systems, poor road infrastructure, and the like, and which is adaptive to variations in waste quantity and quality.

The inventors have realized that drones can help solve some or all of these issues, such as the buildup of waste. For instance, a more proactive approach could prevent the buildup of waste, by reducing the time in which waste is left in the open. Leaving waste exposed can lead to the transmission of waterborne diseases.

A major advantage of using drones in the applications disclosed herein is that the waste collection or collection of recyclable items can occur for either remote or densely populated locations. The collected items can be brought to one or more central locations depending on the types and characteristics of the bags and the properties of the waste in the bags.

The exemplary drone waste collection and management systems and methods need not eliminate the current practices (e.g., trucks collecting waste and waste in bags), but may augment the current practices in various ways described. For example, waste collection trucks with different compartments (for instance, for household trash, commercial trash, environmental waste, contaminated waste, recyclables, and the like) may be used as moving waste aggregation centers wherein a drone can fly to one of the nearby trucks for dumping. Based on the movement geolocations of the trucks and drone flying directions or patterns, the drone or drone swarm and trucks may maintain routing maps dynamically.

Figure 1:
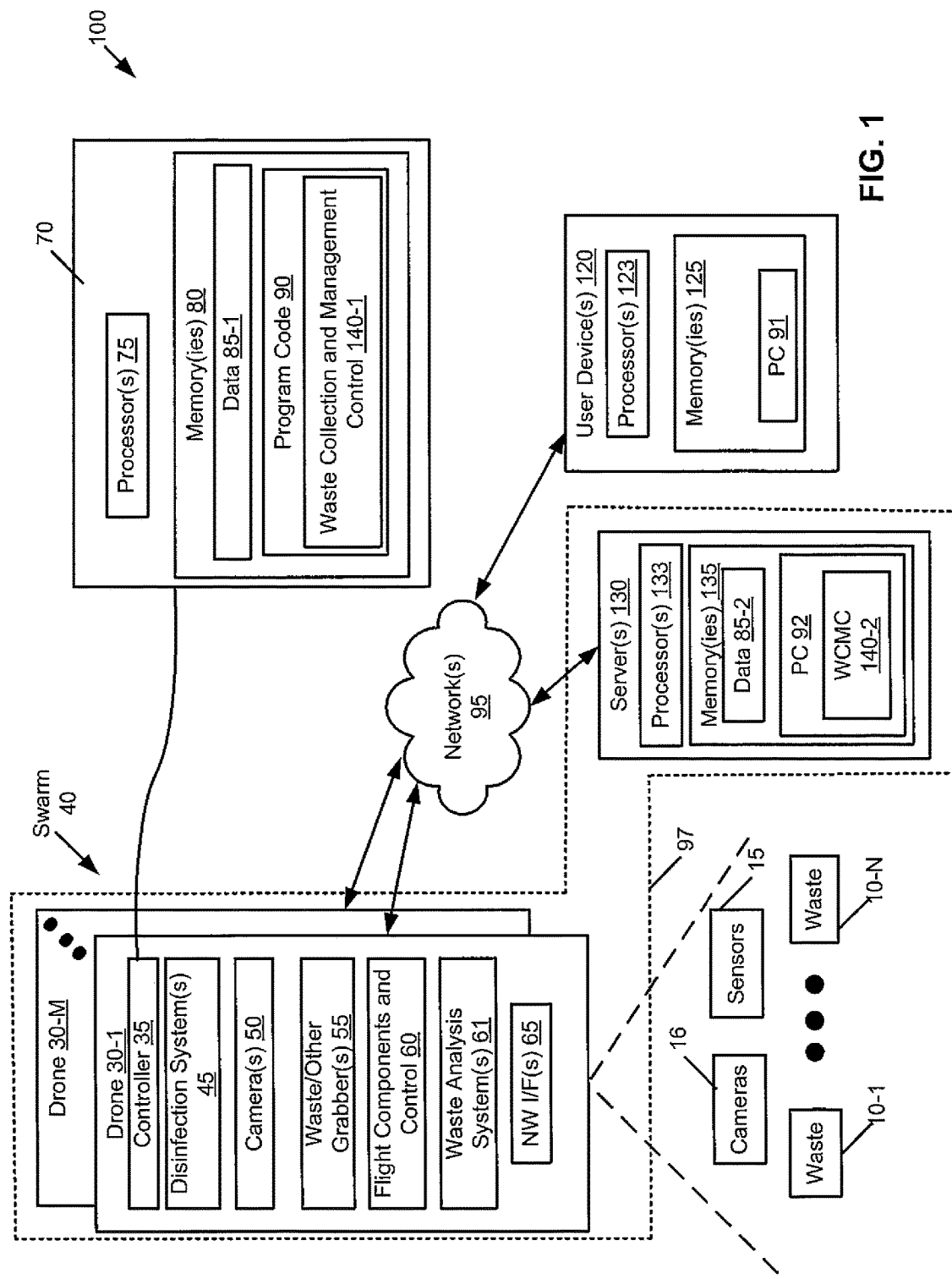
FIG. 1 illustrates an exemplary system for a drone and drone-based system for collecting and managing waste for improved sanitation.

Additional detailed description of exemplary embodiments is presented after an exemplary system is introduced in reference to FIG. 1. Turning to FIG. 1, this figure illustrates an exemplary system 100 that may be used for a drone and drone-based system for collecting and managing waste for improved sanitation. The system 100 is merely exemplary and illustrates one possible system, and others may be used. The description of FIG. 1 is primarily an introduction to the elements in the system 100, and many of the elements will be described in more detail after the description of FIG. 1.

There may be one or multiple drones 30, depending on implementation. FIG. 1 illustrates M drones, and multiple drones 30 are called a "swarm" 40 of drones herein. A single drone 30 will be described, and it assumed all drones are similar. The drone 30-1 (often, referred to as "drone 30") in this example analyzes the waste items 10-1 through 10-N and performs one or more remedial actions based on the analysis. There could be one or multiple waste items 10. The waste items 10 may be any one or more of the following, as non-limiting examples: household trash; commercial trash; environmental waste; contaminated waste (e.g., contaminated with lead, asbestos, water contaminated with oil); recyclables (e.g., used glass, metal, plastic containers); and/or electronic waste, all of which may be from public or private locations.

It should be noted that the drone may also be referred to as an Unmanned Aerial Vehicle (UAV), Unmanned Aircraft Vehicle System (UAVS), or Unmanned Aircraft System (UAS). The drone 30 is assumed to be a drone with vertical takeoff and landing capability, and also hovering capability. However, other drone types such as airplane types, which need a runway to take off and may not be able to hover, may be used. The drone 30 in one example comprises a controller 35, one or more disinfection systems 45, one or more cameras 50, one or more waste/other grabbers 55, flight components and flight control 60, one or more waste analysis systems 61, and one or more network (NW) interfaces (I/F(s)) 65. The one or more network interfaces 65 allow the drone to communicate over the network(s) 95, which could include a LAN (local area network), and/or the Internet, and/or other networks such as Bluetooth (a short range wireless connectivity standard). Not shown in FIG. 1 is a wireless controller for the drone 30, as the drone 30 is considered to be wholly autonomous, but a wireless controller could be used to augment or replace some of the autonomous capability of the drone 30. A network interface 65 could be used to communicate with the wireless controller, too, and the wireless controller would be used, e.g., by a human being used to control the drone.

The waste/other grabbers 55 may be of any type of implement that can grab onto waste items 10 and allow the drone 30 to carry and separate waste items 10. There are a number of grabbers that can be used, such as the mantis drone claw, and the grabber(s) 55 can include robotic devices, too. The flight components and flight control 60 are such items as rotors and corresponding motors or engines, control systems for flight, and the like. The waste analysis system(s) 61 may be used to determine properties of the waste, such as chemicals and/or odors being emitted from the waste, whether the waste is liquid or solid or some combination of these, whether bacteria are present on the waste, whether flies and/or rodents are present, and the like.

The controller 35 comprises circuitry 70. The circuitry 70 is shown as one or more processors 75 and one or more memories, and the memories comprise data 85-1 and program code 90. The one or more processors 75 cause the drone to perform operations as described herein, in response to loading and execution of the program code 90. This is merely one example, and the circuitry 70 may be implemented (in whole or part) by other hardware such as very large scale integrated circuits, programmable logic devices, and the like. The circuitry 70 may also include the processors 75 and memories 80 and also this other hardware, as an example.

The data 85-1 may include any of the data described herein, such as one or more of the following examples of data used for waste remediation: aerial imagery of the waste, e.g., from the drone itself, cameras installed at certain locations, people using social media, and the like; signals (e.g., messages) of location information of the waste; an indication of a number of bags (or other waste items) and their content; any data from analysis of waste; weight and size of the waste; and the like. The program code 90 comprises waste collection and management control code 140-1, portions of which are described in more detail below.

The system 100 may also include one or more user device 120 comprising one or more processors 123 and one or more memories 125, where the one or more memories 125 contain program code (PC) 91. Note that the user device 120 would typically comprise other elements, such as user interfaces (e.g., touch screen, keyboards, mice, displays, and the like), wired or wireless network interfaces, which are not shown. The one or more processors 123, in response to loading and execution of the program code 91, cause the user device 120 to perform whatever operations are performed by the device.

The system 100 includes a computer system characterized as a server 130. The server 130 includes one or more processors 133 and one or more memories 135, which include data 85-2 and program code (PC) 92, which includes waste collection and management control (WCMC) code 140-2. The one or more processors 133, in response to loading and execution of the program code (PC) 92 and specifically the WCMC code 140-2, cause the server 130 to perform whatever operations are performed by the server for the instant exemplary embodiments. It should be noted that there could be multiple servers, and the servers 130 could be relatively local to the drone 30 (e.g., on a truck within radio frequency distance from the drone 30) or remote from the drone 30 (e.g., based in the Internet or on the cloud in the same or different country from the drone 300 and not within radio frequency range of the drone, or some combination of these.

FIG. 1 also illustrates one or more sensors 15 that may be used to sense various data about the waste items 10. For instance, the sensors 15 may be weight scales that will send signals to the drone 30 based on, e.g., the waste items 10 weighing more or less than a predetermined weight. As additional examples, the sensors 15 can be equipped with weight scales, intelligent cameras, visual analytics, and neural net capabilities and may count the number of bags dumped so far, detect an accumulation of flies or vermin around the bags (e.g., rats), detect broken waste bags, detect liquid leaking out of the bags, and decide to send signals to the drone 30 or drone swarms 40 based on this data. For instance, a sensor 15 or sensors 15 may perform any one of more of the following: sensor is equipped with a neural net and visual analytics capabilities to perform one or more of the following: counting a number of the bags of waste dumped so far and sending signal(s) in response to a count of the number of bags exceeding a threshold; detecting accumulation of flies or other animals around the bags and sending the signal(s) in response to the accumulation exceeding a threshold; detecting broken waste bags and sending the signal(s) in response to the detection of the broken waste bags.

Alternatively or in addition to the sensors 15, (e.g., low-cost) cameras 16 can be installed at collection sites and may send images to a remote server 130, where advanced image processing algorithms may be used to determine if the waste containers (by the processed images) are full and need to be picked up and new containers delivered. It should also be noted that a drone 30 may perform this (or any other processing described herein), if the drone 30 has the capability of doing so. As another example, when bags are full (by weight or volume) a message is sent to pick up the bags or containers and drop off new ones. Of course, a drone 30 or swarm 40 of drones 30 may have a regular pick-up time and date on an automated calendar.

In further detail, FIG. 1 illustrates a possibility of a drone-based system 97, which consists of only the drone 30 in some embodiments and comprises both the drone 30 and one or more server(s) 130 in other embodiments. For instance, the drone-based system 97 may be a combination of a client system (i.e., the drone 30) and a server system (i.e., the server or servers 130 in this example). The drone 30, e.g., under control at least in part by the waste collection and management control code 140-1, may in this case be considered to be a front end (FE), and the server 130, e.g., under control at least in part by the waste collection and management control code 140-2, may be considered to be a backend (BE). In these scenarios, the two waste collection and management control codes 140-1 and 140-2 interoperate to perform the functionality described herein. For instance, depending on the capability and computation power of the drone 30, most of the system capabilities may run on the drone 30 itself, but the client system may also off-load some of the computation to the backend (e.g., the server 130). The data 85 may also be split or repeated in whole or part between the drone 30 (with data 85-1) and the server 130 (with data 85-2). The backend system may process, analyze, and/or store (e.g., on a database) information and return results to the client system running on the drone 30. The backend system as server 130 may be hosted on a cloud or non-cloud environment. Note also that the drone 30 has or may have a storage component (e.g., memories 80) that can buffer or store streaming data 85-1. The streaming data 85-1 may from time-to-time be sent to backend storage (on a cloud or non-cloud dedicated backend system) as memories 135 and data 85-2. The sending of data to the backend system may be based on the processing capabilities of the drone or server (e.g., typically servers have more processing capabilities), and/or based on where applications can be run. For instance, image processing may require video cards or video processors and corresponding applications that can be run on a server 130 but not on the drone 30.

Furthermore, while there are many elements in the program code 90 and the data 85 that are attributed to the drone 30 in the description below, some or all of these elements (or portions of them) may be added to the server 130 and its program code 92. For instance, some or all of the waste management functions (described, e.g., in FIG. 2) may be performed by the server 130. Similarly, some or all of the data 85 may be stored by the server 130. This offloads some of the processing and/or data storage from the drone 30 to the server 130, and the exact amounts of what will be stored or where the processing will take place is up to the implementation. The server 130 may also be in the cloud, or there could be multiple servers 30, e.g., each performing some function, or a combination of local servers (e.g., onsite) and remote servers (e.g., in the cloud).

The computer readable memories 80, 125, and 135 may be of any type suitable to the local technical environment and may be implemented using any suitable data storage technology, such as semiconductor based memory devices, flash memory, magnetic memory devices and systems, optical memory devices and systems, fixed memory and removable memory, or some combination of these. The processors 75, 123, and 133 may be of any type suitable to the local technical environment, and may include one or more of general purpose processors, special purpose processors, microprocessors, gate arrays, programmable logic devices, digital signal processors (DSPs) and processors based on a multi-core processor architecture, or combinations of these, as non-limiting examples.

The user device 120 and the server 130 may be, e.g., personal computer systems, laptops, wireless devices such as smartphones and tablets, and "computer systems" formed in the cloud from multiple processors and memories.

Figure 2B:
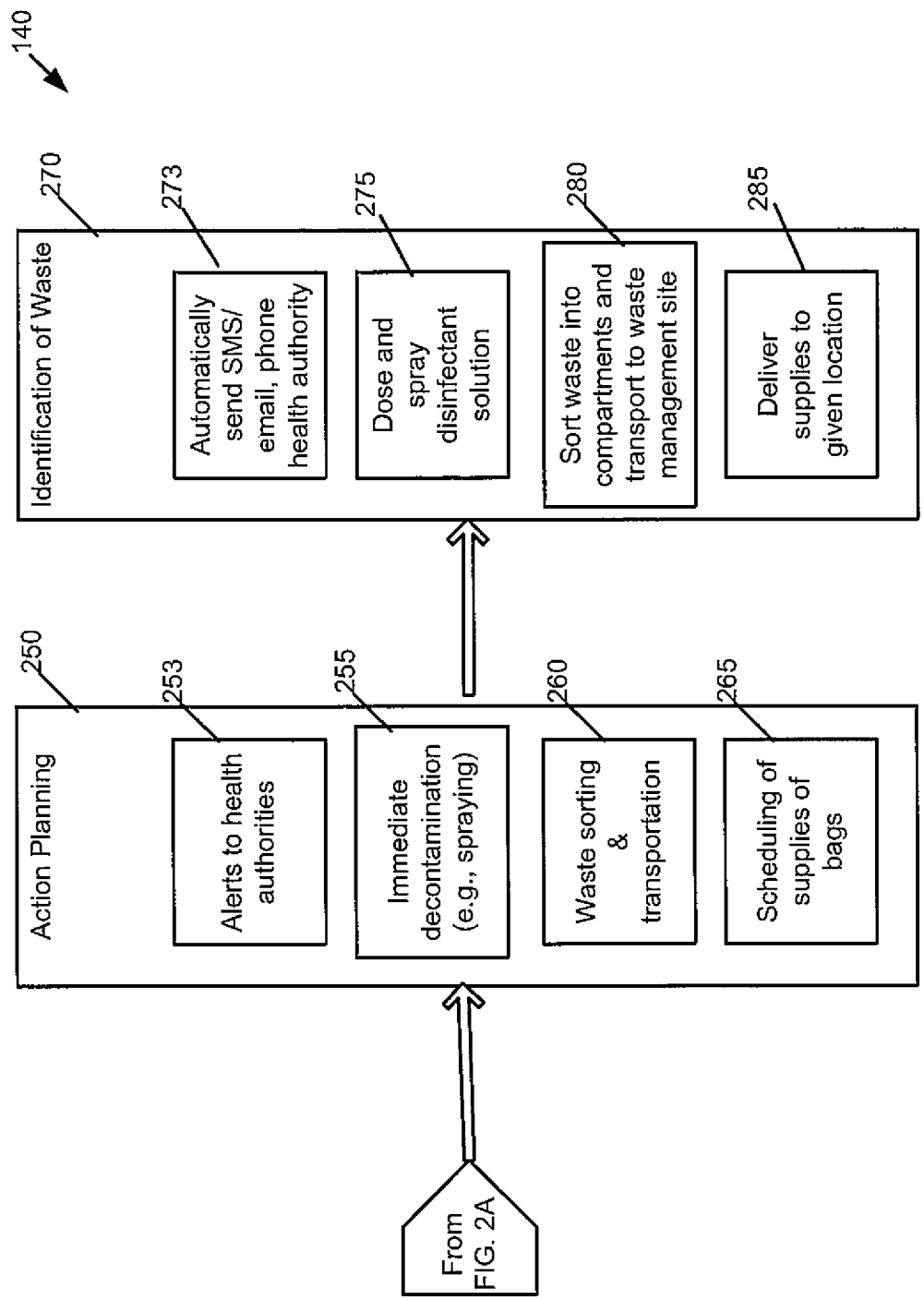

Referring to FIG. 2, divided into FIGS. 2A and 2B, this figure illustrates a block diagram of a possible implementation of the waste collection and management control code 140, which is separated into a number of logical sections 210, 290, 230, 250, and 270. These logical sections 210, 290, 230, 250, and 270 are also one possible flow for the waste collection and management control code 140, as follows: the operations by the determination of waste buildup 210 are performed prior to operations performed by the identification of waste module 290; the operations by the identification of waste module 290 are performed prior to operations performed by the hazard risk assessment engine 230; operations performed by the hazard risk assessment engine 230 are performed before operations performed by the action planning module 250; and the operations performed by the action planning module 250 are performed prior to operations performed by the remedial action model 270.

The determination of waste buildup module 210 performs one or more of the following non-limiting operations. In block 213, the determination of waste buildup module 210 performs analyses related to a crowd-sourcing platform and/or a social media platform (block 213). That is, human generated (e.g., crowd sourced) images can be sent to a remote server 130 (or the drone 30 or both), which would perform the determination of the waste buildup. The determination of waste buildup module 210 may also perform image analysis from smartphones (block 215) to determine waste buildup. As previously described, in-situ sensors 15 may be used to collect and send data about the waste items 10, and the determination of waste buildup module 210 performs analysis of this data in block 225 to identify waste buildup. The determination of waste buildup module 210 may also have set times where waste is scheduled to be collected, see block 228.

Once waste has been determined to be built up, the identification of waste module 290 may analyze the type of a bag (e.g., biodegradable paper or plastic) of waste in block 203 and may analyze the one or more properties of the bag (e.g., type of bag: condition of bag, whether the bag has holes, whether the bag is porous, and the like) in block 205. Additionally, the identification of waste module 290 may analyze a property or the properties of the waste itself (e.g., weight/fullness of bag, liquid versus hard waste, formation of worms/bacteria, and the like) in block 207. The characterization of the bags may be based on real-time imaging of the bag (and waste inside the bag) and use, e.g., deep neural nets. See block 208. The identification of waste module 290 then may trigger risk assessment software in the hazard risk assessment engine 230 to assess the risk level of waste, e.g., transmitted bacteria such as typhoid.

More specifically, the hazard risk assessment engine 230 performs one or more risk assessments (see one or more of blocks 233-245) of the identified waste items 10. The risk assessments are typically related to human health, such as the ability for the waste or vermin associated with the waste to transmit or cause communicable diseases, the waste itself being deleterious to human health (e.g., poisons that can be spread by air or water; asbestos; the like), or any other hazard to human health. Note that the health could also be animal health, such as if system was used near a herd of cattle, sheep, chickens, or the like. In block 233, the hazard risk assessment engine 230 performs visual analytics of the waste items 10, including, e.g., neural nets. The hazard risk assessment engine 230 may also use social media analytics (e.g., sentiment analysis based on reported tweets e.g., character messages) in block 235 to determine the hazard for humans associated with a waste item 10. The hazard risk assessment engine 230 may also use context analytics (e.g., weather forecast, location) to determine whether any health hazards for humans exist for a waste item 10. See block 240. In block 245, the health hazard risk assessment engine 230 uses predictive models for communicative diseases (e.g., predicting or forecasting disease outbreak, transmission patterns given results of context analytics and local temperature/humidity data). The hazard risk assessment engine 230 will then alert the action planning module 250, for any determined hazards.

The action planning module 250 determines whether any actions should be taken based on the previously determined hazards, and also what those actions should be if they are deemed necessary. The action planning module 250 may decide, for instance, to send one or more alerts to health authorities in block 253. The action planning module 250 may additionally or alternatively decide to perform immediate decontamination, such as spraying (e.g., of disinfectant solution(s)), in block 255. Additionally or alternatively, the action planning module 250 may perform waste storing and transportation in block 260. For instance, the drone 30 may transport the waste item 10 to a storage location for short or long term storage. In block 265, the action planning module 250 performs scheduling supplies of bags, e.g., to be used for additional waste disposal. Once the action planning is performed, the action planning module 250 alerts the remedial action module 270, which causes the drone 10 and/or drone-based system 97 to take remedial action(s) for the waste item 10.

The remedial action module 270 may perform one or more of the operations 273-285, e.g., to take action to reduce or eliminate the effects of the waste item 10. Such remedial actions may include automatically sending an SMS (short message system, e.g., text message) message and/or sending an email and/or calling by phone (and/or performing some other communication) to the health authority or authorities. See block 273. The sending may be performed by the drone 10 or the drone-based system 97. In block 275, the remedial action module 270 causes the drone 10 to dose and spray disinfectant solution(s) on the waste item 10. In block 280, the remedial action module 270 causes the drone 10 to perform the remedial action of sorting waste into compartments and transporting the waste to a waste management site. In block 285, the remedial action module 270 instructs the drone 10 to deliver supplies (e.g., biodegradable waste bags, environmental friendly disinfectants such as anti-bacterial liquid, if a disease outbreak is predicted in two-days, etc.) to a given location.

Figure 3:
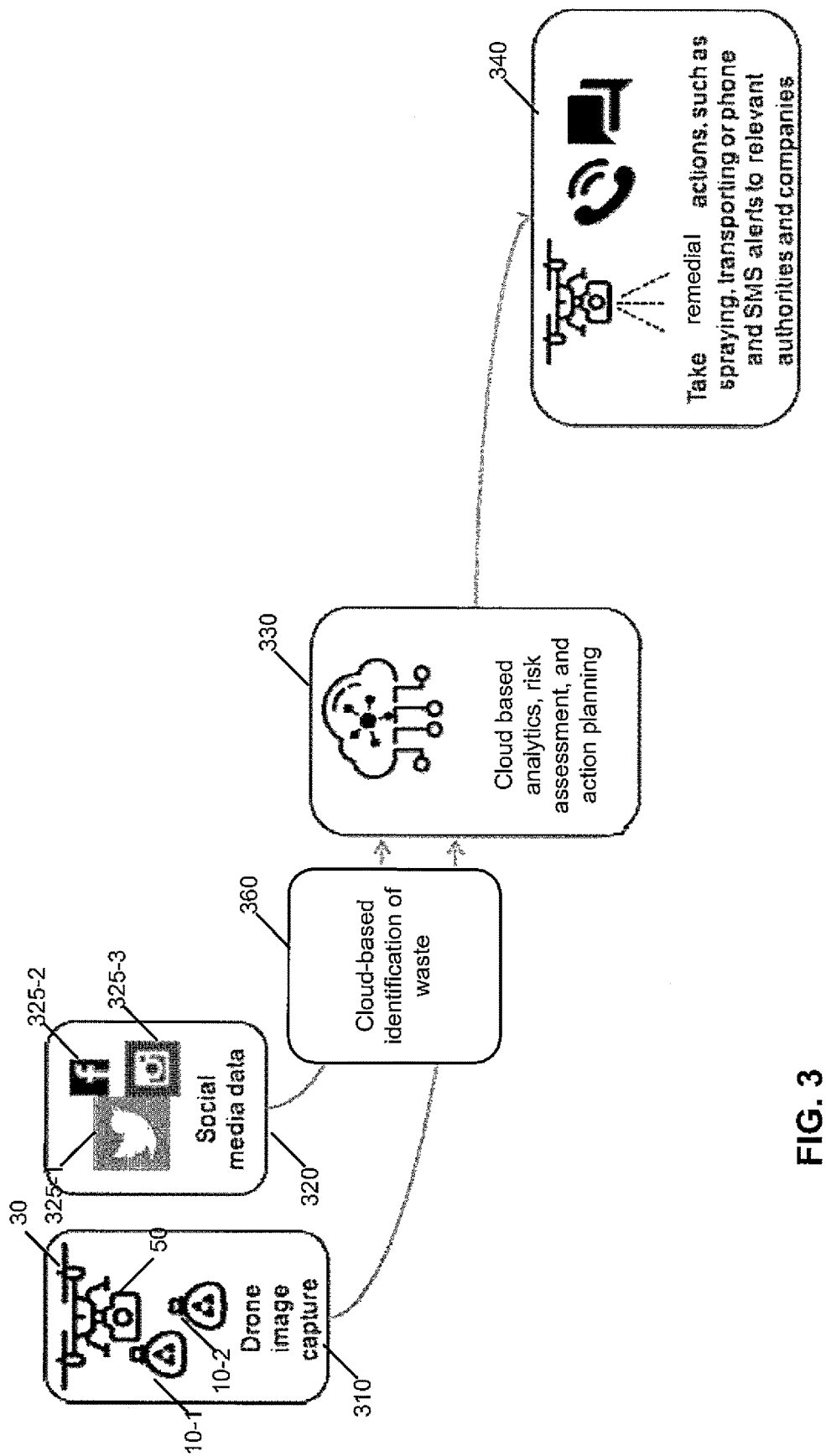
FIG. 3 illustrates one possible flowchart for a drone and drone-based system for collecting and managing waste for improved sanitation.

Referring to FIG. 3, this figure illustrates one possible flowchart for a drone and drone-based system for collecting and managing waste for improved sanitation. FIG. 3 is divided into logical sections, 310/320 (where waste buildup is determined, e.g., as in block 210 of FIG. 2), 360 (where waste is identified, as in block 290 of FIG. 2), 330 (where waste is assessed, and remedial actions are planned, e.g., as in blocks 230 and 250 of FIG. 2), and 340 (where remedial actions are performed, e.g., as in block 270 of FIG. 2). In this example, a drone 10 with its camera 50 may perform image capture (block 310) of multiple waste items 10-1 and 10-2. Images of or information about the waste items 10-1 and 10-2 may be also be sent by social media data 320, such as via one or more of the following exemplary social media applications 325: TWITTER 325-1 (an online social networking service that enables users to send and read short 140-character messages called "tweets"); FACEBOOK 325-2 (a for-profit corporation corresponding free social networking site); and/or INSTAGRAM 325-3 (a social network application that allows uploading, editing, and captioning photos). Note also that a human being may report waste items using a system that supports interactive voice response (IVR).

In block 360, a server 130 (in the cloud, in this example) performs cloud-based identification of waste. As previously described, this identification of the waste could be performed by real-time imaging and/or neural net analysis, among other techniques.

In block 330, the server 130 performs (in this example) cloud-based analytics for risk assessment and action planning. In block 340, the drone 10 and/or drone based system 97 takes remedial (e.g., ameliorable) actions, such as performing spraying of the waste, transporting the waste, or sending alert(s) via phone and/or SMS to relevant authorities and/or companies.

Additional examples are as follows. An exemplary system and a method comprise a flying drone or drone swarm (e.g., and possibly a drone-based system) for waste collection, circuitry allowing the drone to characterize and separate waste items such as bags based on the type of the bag (e.g., biodegradable paper or plastic) and/or properties of the waste (e.g., weight/fullness of bag, waste riskiness). Based on the type and properties, the system and method will perform a risk assessment of said waste, and finally, the drone, drone swarm, and/or drone-based system sends a signal to effect remediation of the waste and/or may take other remediation (e.g., amelioration) actions.

The waste collected may be any one or more of the following: household trash, commercial trash, environmental waste, contaminated waste (e.g., lead, asbestos, water contaminated with oil, human waste), recyclables (e.g., used glass, metal, plastic containers), and the like.

The drone 30 or drone swarm 40 may be sent signals (e.g., containing one or more messages) as to the location of waste. A signal sent to the drone 30 or drone swarm 40 may specify location information, as well as an indication of a number of bags and their content, needing pickup. The devices that send a signal to a flying drone or drone swarm may be triggered based on sensors 15 (or be part of sensors 15) deployed at the waste collection location (e.g., based on weight or fullness of the trash bags) or by human beings (who observe the number of bags needing pickup). The sensors 15 can be equipped with weight scales, intelligent cameras and neural net capabilities and may count the number of bags dumped so far, detect an accumulation of flies or vermin around the bags (e.g., rats), detect broken or leaky waste bags, and decide to send a signal to the drone or drone swarm, to have the drone or drone swarm take remediation action(s). Note also that the signal may be sent to the drone-based system 97, such as to the server 130, and the server 130 could then relay the signal to the drone 30 or drone swarm 40, or otherwise alert the drone 30 or drone swarm 40 of the waste.

Alternatively or in addition, (e.g., low-cost) cameras 16 can be installed at collection sites and may send images to a remote server 130, where advanced image processing algorithms (e.g., as part of the waste collection and management control code 140) may be used to determine if the waste containers are full and need to be picked up and new containers delivered. As another example, when bags are full (by weight or volume), a message is sent to pick up the bags or containers and drop off new ones. Human-generated (crowd-sourced) images can be sent to the remote server 130. A drone may also have a regular pick-up time and date on an automated calendar (in addition to or in lieu of other options herein).

The characterization of the bags (e.g., performed in part by the identification of waste module 290) may be based on real-time imaging of the bag (and waste inside the bag) and deep neural nets (e.g., as part of the waste collection and management control code 140). Specifically, the characterization software utility (e.g., as part of the waste collection and management control code 140) analyzes the type and property of the bag (e.g., biodegradable paper and/or plastic, or the like), whether the bag has been split open or not, whether there are liquids leaking from the bag, and the properties of the waste itself (e.g., weight/fullness of bag, liquid versus hard waste, formation of worms/bacteria, and/or the like). The utility then may trigger a proposed risk assessment software utility (e.g., as part of the hazard risk assessment engine 230 of the waste collection and management control code 140) to assess the risk level of waste, e.g. transmitted bacteria such as typhoid. The risk assessment module (e.g., as part of the waste collection and management control code 140) may be based on hybrid models which may comprise: deep neural net, visual analytics, social media and/or context analysis on the collected waste. Based on risk assessment, a determination or estimation is made of the accumulation of bacteria or attraction of other (e.g., dangerous) pests. The pests may be considered dangerous if the pests are a hazard to humans (or other animals). The risk assessment module can further assess if the detected bacteria could be a potential for causing typhoid or cholera outbreak in the region. Therefore, based on the type and properties of the waste items 10 and risk assessment of the waste items 10, the drone 30 may take remedial (e.g., amelioration action) such as alerting responsible authorities, spraying environmental-friendly disinfectant and such as flying to a biofuel or a bio-fertilizer processing factory and trigger processing of the waste items 10.

Additionally or alternatively, based on detected disease formation, the drone 120 can automatically take amelioration actions such as spraying anti-bacterial liquid, alerting health official(s), and/or broadcasting to social media to create awareness or to further validate the situation.

The drone 30 and/or drone-based system 97, in one embodiment, may take high definition images and send to remote experts for further analysis or the drone 30 can collaborate with other specialized drones for image processing.

Optionally, the drone 30 can have multiple sensors (e.g., as part of the waste analysis system 61) to sense what is inside a bag for bags with unknown content. The sensors may be able to sense smells and the drone 30 may be able to reason on the intensity of the smells and correlate the smells with benchmarked smell(s). This information can be used by the risk assessment module (e.g., the hazard risk assessment engine 230).

In other embodiments, the drone can also deliver new biodegradable waste bags (e.g., a Peepoo bag) to certain locations. The usage of the drone can be for private use or public use based on subscription-based services. A smart electronic calendar can be integrated to orchestrate service delivery per household even outside of densely populated urban areas, e.g., with poor resource constraints such as poor or otherwise no sewage system and sanitation system, poor road infrastructure, and the like.

Other use cases include the following: hikers (e.g., there can be problems with waste at hiking locations); boaters (e.g., many boaters dump waste overboard rather than storing in on the boat); campers; refugee camps (e.g., which are typically rapidly built and growing camps often have poor sanitation services). The drone can have multiple compartments for storing different types of waste.

In other embodiments, the drone can perform sensing and verification, and send signals to self-driving cars (or trucks) to collect the waste and carry out amelioration actions. Amelioration actions include many actions such as dehydrating to reduce payload, neutralizing hazardous bio-waste through spraying, and/or the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
identifying a type of a waste item at a waste collection location using at least a drone-based system;
characterizing by the drone-based system one or more properties of the waste item;
performing a risk assessment based on the characterized one or more properties of the waste item, wherein the risk assessment is assessing a risk level caused by content of the waste item; and
in response to the risk assessment, controlling one or more drones of the drone-based system to take at least one action based on the identified type and the characterized one or more properties of the waste item to cause biofuel or a bio-fertilizer processing of the waste item to reduce or eliminate the risk level caused by the content of the waste item.

2. The method of claim 1, wherein the risk assessment is performed with at least one server of the drone-based system.

3. The method of claim 2, in which the waste item is one of a plurality of waste items in a collection of waste, and wherein the risk assessment is performed based on analyzed properties of the waste item indicating an estimated formation of bacteria or attraction of pests.

4. The method of claim 3, in which the estimated formation of bacteria is assessed as a potential for a disease outbreak, wherein the at least one action is taken based on the assessed potential for the disease outbreak.

5. The method of claim 1, wherein the drone-based system comprises the one or more drones and one or more servers.

6. The method of claim 1, further comprising separating by the one or more drones the waste item from other waste items.

7. The method of claim 1, in which the waste item comprises one or more of: household trash, commercial trash, environmental waste, contaminated waste, recyclables, and electronic waste.

8. The method of claim 1, in which the identifying, the characterizing, the performing the risk assessment, and the taking the at least one action are performed in response to receiving one or more signals at the drone-based system from one or more of: one or more camera sensors deployed at the waste collection location where the waste item resides, a human being via one or more of a phone call, an interactive voice response system, and a short message system message or a social media application.

9. The method of claim 8, in which the waste item is one of a plurality of waste items comprising bags of waste, and in which at least one of the one or more signals is generated by the one or more camera sensors deployed at the waste collection location or one or more in-drone-built-in camera sensors, wherein camera sensors of the one or more camera sensors deployed at the waste collection location or the one or more in-drone-built-in camera sensors utilize a neural net and visual analytics capabilities to perform one or more of:
counting a number of the bags of waste dumped and sending the at least one of the one or more signals in response to a count of the number of bags exceeding a threshold;
detecting accumulation of flies or other insects or animals around the bags and sending the at least one of the one or more signals in response to the accumulation exceeding a threshold; and
detecting leaking or broken waste bags of the bags of waste and sending the at least one of the one or more signals in response to the detection of the leaking or broken waste bags.

10. The method of claim 1, in which the waste item comprises a plurality of waste items contained in a plurality of bags, wherein the method further comprises separating by the one or more drones the plurality of bags, wherein the separating of the plurality of bags is based on a type of each of the plurality of bags and one or more properties of a waste item in each of the plurality of bags.

11. The method of claim 1, comprising, further in response to the risk assessment one or more of:
spraying disinfectant on the waste item;
alerting one or more health officials;
instructing one or more nearby waste collection and aggregation trucks to dehydrate waste in the waste item to reduce payload; and
broadcasting to social media to create awareness or to further validate a situation.

12. The method of claim 1, in which the at least one action comprises: collecting the waste item and flying by the one or more drones of the drone-based system the collected waste item to a biofuel or bio-fertilizer processing factory for the biofuel or bio-fertilizer processing.

13. The method of claim 1, wherein the at least one action comprises collecting the waste item by the one or more drones of the drone-based system to deliver to a different location for the biofuel or bio-fertilizer processing, and wherein the method further comprises:
determining a waste buildup of the waste item using image processing algorithms, comprising determining based on the waste buildup that the waste item needs to be delivered to the different location.

14. The method of claim 1, comprising the one or more drones collecting the waste item, and flying the collected waste item to one or more nearby waste collection and aggregation trucks to dump the collected waste item into one or more compartments of the one or more nearby waste collection and aggregation trucks, wherein the one or more compartments are for one or more of: household trash, commercial trash, environmental waste, contaminated waste, recyclables, and electronic waste.

15. The method of claim 14, comprising using a visual analytics capability to count a number of bags of the collected waste item dumped so far and sending signals in response to the count of the number of bags exceeding a threshold.

16. The method of claim 14, in which the one or more nearby waste collection and aggregation trucks comprises different compartments for sorting the collected waste item based on the identified type and the characterized one or more properties of the waste item.

17. The method of claim 14, in which the flying of the one or more drones to the one or more nearby waste collection and aggregation trucks is based on a dynamically maintained, by the one or more drones and by the one and more nearby waste collection and aggregation trucks, routing map.

18. The method of claim 1, wherein the risk assessment uses predictive models comprising predicting disease transmission patterns based on at least humidity data to assess the risk level caused by the content of the waste item.

* * * * *